United States Patent Office 3,577,452
Patented May 4, 1971

3,577,452
ORGANIC ESTERS OF BIVALENT SULFUR
Quentin E. Thompson, Belleville, Ill., assignor to
Monsanto Company, St. Louis, Mo.
No Drawing. Original application Dec. 28, 1964, Ser. No. 421,672, now Patent No. 3,357,993, dated Dec. 12, 1967. Divided and this application Aug. 10, 1967, Ser. No. 668,734
Int. Cl. C07c 145/00
U.S. Cl. 260—456
5 Claims

ABSTRACT OF THE DISCLOSURE

Compounds represented by the structure:

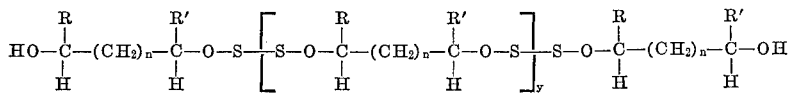 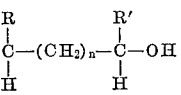

where $y$ is an integer from 0 to 10, R and R' are each selected from the group consisting of hydrogen, alkyl radicals having from 1 to 16 carbon atoms, cycloalkyl radicals having from 5 to 6 carbon atoms, cycloalkylalkyl radicals having from 7 to 17 carbon atoms, alkenyl radicals having from 2 to 16 carbon atoms, providing that the total of the number of carbon atoms of R and R' is not greater than 20, and aryl radicals and $n$ is an integer from 0 to 16 and a method for preparing said compounds.

---

This application is a divisional of applicant's copending application Ser. No. 421,6672, filed Dec. 28, 1964, now U.S. Pat. 3,357,993, issued Dec. 12, 1967.

This invention relates to a new class of compounds and to their method of preparation. More particularly, this invention relates to cyclic sulfur esters of dihydric alcohols and to acyclic polymeric compounds thereof.

The novel cyclic esters of this invention can be represented by the structure (I)

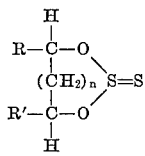

where R and R' are each selected from the group consisting of hydrogen, alkyl radicals having from 1 to 16 carbon atoms, cycloalkyl radicals having from 5 to 6 carbon atoms, cycloalkylalkyl radicals having from 7 to 17 carbon atoms, alkenyl radicals having from 2 to 16 carbon atoms, provided that the total of the number of carbon atoms of R and R' is not greater than 20, and $n$ is an integer from 0 to 1.

The novel polymers of this invention can be represented by the structure (II) 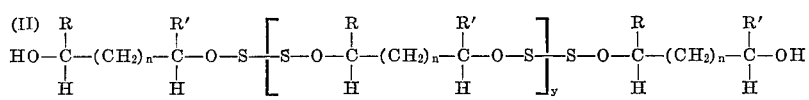 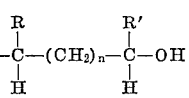

where $y$ is an integer from 0 to 10 and R and R' are each selected from the group consisting of hydrogen, alkyl radicals, radicals having from 1 to 16 carbon atoms, cycloalkyl radicals having from 5 to 6 carbon atoms; cycloalkylalkyl radicals having from 7 to 17 carbon atoms, alkenyl radicals having from 2 to 16 carbon atoms, provided that the total of the number of carbon atoms of R and R' is not greater than 20, and aryl radicals and $n$ is an integer from 0 to 16.

The cyclic compounds and polymers of this invention are prepared by reacting aliphatic diols with sulfur monochloride in the presence of at least 2 mols of tertiary amine per mol of sulfur monochloride and in the presence of an inert diluent.

Depending upon the concentration of sulfur monochloride and diol in the reaction mixture, either cyclic monomers, acrylic polymers or mixtures thereof can be prepared according to the method of this invention. The presence of excess diol in the reaction mixture favors the formation of polymeric esters (structure II). The formation of cyclic monomeric esters (structure I) is favored when substantially equimolar amounts of sulfur monochloride and diol are brought together in inert diluent under dilute conditions, for example, where the molar concentration of each reactant in the reaction mixture is substantially equal and less than about .002 molar. When the diol concentration in the reaction mixture exceeds .002 molar and when the diol concentration is substantially greater than that of the monochloride, proportionately less monomer and more polymer is formed. When the diol concentration in the reaction mixture is greater than 1 molar substantially all of the product is a polymer (structure II).

In carrying out the process of this invention to produce polymers of structure II, sulfur monochloride and dihydric alcohol are each first diluted with an inert diluent after which the tertiary amine is combined with the dihydric alcohol-diluent mixture. The mixture of sulfur monochloride and diluent is then added to the mixture of dihydric alcohol, amine and diluent. To produce compounds of structure I simultaneous addition of sulfur monochloride and a mixture of diol and tertiary amine to a reaction zone containing an inert diluent is made so that the molar ratios of sulfur monochloride, diol and tertiary amine are about 1:1:2, respectively, in the reaction zone and the diol and chloride concentrations are no greater than about .002 molar. Using the latter procedure but allowing reactant concentrations above about .002 molar produces a mixture of esters of structures I and II. The esters can be easily separated from each other by conventional means such as by fractional distillation. The reaction of the diol with sulfur monochloride takes place at temperatures in the range of about −50° C. to about 80° C. and preferably from 0° C. to 25° C. Although the reaction takes place nearly instantaneously, it is usually advisable to agitate the reaction mixture during the addition of sulfur monochloride and for a short time thereafter to assure completion of the reaction and proper control of reaction temperature.

The tertiary amine used in the process of this invention functions as an acid acceptor in the reaction mixture and forms a hydrochloride salt by combining with hydrogen chloride which is formed as a by product in the reaction of alcohol and sulfur monochloride. At the completion of the reaction, removal of the amine salt is conveniently accomplished by extraction with water, preferably ice water. The water soluble amine salt separates from the water-insoluble sulfur esters and is decanted with the aqueous phase of the mixture.

An inert or neutral diluent is employed in producing cyclic esters to control the concentration of the reactants and to render the reaction mixture stirrable during and after completion of the reaction. In the case of cyclic esters the amount of diluent needed is dependent on the amount of sulfur monochloride and diol employed. An inert diluent is employed in producing polymeric esters to render the reaction mixture stirrable during and after completion of the reaction. In the case of producing polymers the amount of diluent will vary depending upon the characteristics of the particular diol employed and the solubility of the amine hydrochloride produced. One skilled in the art can easily determine the amount of diluent convenient for particular compounds by following the teaching of the examples hereinafter set forth. In preparing either cyclic or polymeric esters of this invention, the diluent is selected so that its volatility will be sufficiently different from that of the desired ester to ensure easy separation of the two materials. The crude ester, depending on its physical properties, is purified by conventional techniques such as distillation, crystallization or solvent extraction.

Typical examples of diluents useful in the method of this invention are chlorinated hydrocarbons, such as carbon tetrachloride, trichloromethane (chloroform) and preferably dichloromethane (methylene chloride) and aliphatic and cycloaliphatic ethers such as diethyl ether, tetrahydrofuran, diisopropyl ether and dioxane. Also, tertiary amine can be used as a diluent by adding an amount in excess of that required to combine with all of the hydrogen chloride produced by the reaction.

Dihydric alcohols which can be employed in the method of this invention to produce cyclic esters include aliphatic 1,2- and 1,3-diols having from 2 to 18 carbon atoms, cycloalkyl aliphatic 1,2- and 1,3-diols having from 8 to 20 carbon atoms and olefinic 1,2- and 1,3-diols having from 4 to 24 carbon atoms. Dihydric alcohols which can be employed in the method of this invention to produce polymeric esters include any aliphatic diol, substituted aliphatic diol and cycloalkyl diol having from 2 to 18 carbon atoms, regardless of the relative position of the hydroxyl groups.

As used herein, the term 1,2- and 1,3-diols is intended to mean aliphatic alcohols, substituted aliphatic alcohols and cycloaliphatic alcohols containing two hydroxyl groups, each group attached to adjacent carbon atoms (1,2-) or to carbon atoms separated by not more than one carbon atom (1,3) of the aliphatic compound.

Tertiary amines suitable for use in the method of this invention are those capable of forming amine salts with hydrogen chloride. Aliphatic, heterocyclic and aromatic amines are capable of utilization. Typical amines are trialkyl amines wherein the alkyl radicals have from 1 to 12 carbon atoms, examples of which are trimethylamine, tripropylamine, tributylamine, tri-n-decylamine, dimethylethylamine, dipropylbutylamine and dimethylcyclohexylamine; heterocyclic amines, examples of which are pyridine, quinoline, pyrimidine, N-methylpiperidine and N-ethyl morpholine and aromatic amines, examples of which are N,N'-diethylaniline, N,N'-dimethylaniline and N-methyl diphenylamine. As a practical matter a small amount in excess of the stoichiometric amount required can be employed to assure that all of the hydrogen chloride formed goes to the hydrochloride salt and thereby prevent any reaction of the ester with hydrogen chloride.

The acyclic polymers of this invention prepared from 1,2- and 1,3-aliphatic diols can be catalytically degraded to form the cyclic monomer. The polymers degrade readily upon heating to a temperature in the range of about 50° C. to about 130° C. in the presence of catalytic amounts of alkali metal alkoxide, i.e., 0.1 to 5 mol percent of alkoxide based on the aliphatic diol content of the polmyer. The cyclic monomer produced by polymer degradation can be removed from the reaction vessel upon formation as by distillation under reduced pressure.

Typical examples of alkali metal (Na, Li, K) alkoxides useful as catalysts in preparing the cyclic monomer compounds of this invention from their polymeric form are sodium methylate, lithium ethylate, potassium methylate, sodium ethylate, sodium butylate, potassium ethylate, 2,3-disodium dibutylate, 1,2-disodium diethylate, 1,2-dipotassium dibutylate, 3,4-disodium dioctylate, 1,2-disodium dinonylate, 1,2-dipotassium dioctylate and 1,2-dipotassium dibutylate.

The following examples illustrate specific embodiments of this invention but are not to be construed as limiting its scope. Compositions are given as percent by weight. Parts are parts by weight. The reactor employed in all of the following examples was equipped with means for determining temperature of the reactants, means for agitating the contents and means for the addition and removal of the reactants and products.

(I) PREPARATION OF CYCLIC MONOMERS

Example 1

Into a first container there was added 45 parts of 2,3-butanediol, 102 parts of triethylamine and 500 ml. of dry methylene chloride. Into a second container was added 67.5 parts of sulfur monochloride and 500 ml. of methylene chloride. One liter of alcohol-free trichloromethane was placed in a suitable reaction vessel. After cooling the trichloromethane in the reaction vessel to a temperature between 5° C. and 10° C., slow concurrent addition of reactants from the first and second containers was begun so that the amount of sulfur monochloride in the reaction vessel at no time exceeded that of 2,3-butanediol. The addition was accomplished over a period of five hours while maintaining rapid agitation and the above-stated temperature range. The reaction mixture was agitated for one hour after completion of the addition of the reactants and was then washed with 700 ml. of cold water removing the amine hydrochloride. The organic residue of the reaction mixture was dried and the diluents removed by evaporation under reduced pressure, leaving a thin red colored oil. The oil was vacuum distilled at 1.1 mm. Hg pressure yielding a pale yellow oil, B.P. 57–62° C. (1.1 mm. Hg) which was determined to be cyclic 1,2-dimethylethylene thionosulfite.

Example 2

Generally following the procedure of the previous example, 90 parts of ethylene glycol, 204 parts of triethylamine and 1 liter of dry methylene chloride were combined with 135 parts of sulfur monochloride in admixture with 1 liter of dry methylene chloride in a reaction vessel containing 1.5 liters of trichloromethane previously cooled to a temperature between 5° C. and 10° C. After completion of the reaction the product, cyclic ethylene thionosulfite, was recovered as a colorless fluid having an index of refraction, $n_D^{25}$ of 1.5638.

Example 3

Following the procedure of Example 1, 90 parts of 1,3-butanediol, 204 parts of triethylamine and 1 liter of dry methylene chloride were combined with 135 parts of sulfur monochloride in admixture with 1 liter of dry methylene chloride in a reaction vessel containing 1.5 liters of trichloromethane previously cooled to a temperature between 5° C. and 10° C. After completion of the reaction, the reaction mixture was vacuum distilled yielding a yellow oily liquid. The distillate was purified by repeated fractional distillations. The resulting product was identified as pure cyclic 6-methylpropylene thionosulfite having a boiling point of 40° C. (1 mm. Hg) and an index of refraction, $n_D^{25}$ of 1.5291. The pure material was subjected to elemental analysis, the results of which appear in the table below.

Calculated for $C_4H_8O_2S_2$ (percent): C, 31.56; H, 5.30; S, 43.13. Found (percent): C, 31.26; H, 5.36; S, 43.01.

(II) PREPARATION OF POLYMERS

Example 4

Into a suitable reaction vessel there was charged 90.1 parts of 2,3-butanediol, 204 parts of triethylamine and 500 ml. of methylene chloride. The mixture was cooled to 10° C. and 135 parts of sulfur monochloride in admixture with 150 ml. of methylene chloride was added over a period of 2 hours with agitation at 10° C. to 15° C. The reaction mixture was agitated for 15 minutes after completion of the addition and was then washed with water to remove the amine hydrochloride. The diluent was removed from the residue by evaporation under reduced pressure leaving 147 parts of a viscous red oil having an average molecular weight of 845. The oil was subjected to elemental analysis, the results of which appear below.

Calculated for $(C_4H_8O_2S_2)_x$ (percent): C, 31.56; H, 5.30; S, 42.13. Found (perecnt): C, 31.38; H, 5.43; S, 40.80.

Using the procedure of Example 4, other esters were produced, and characterized. These compounds are listed in Table I below.

amount sufficient to provide a final composition containing 0.80% sulfur by weight

TABLE II

| Compound | Scar diameter, mm. | |
|---|---|---|
|  | 100 kg. load | 150 kg. load |
| Cyclic 1,2-dimethylethylene thonosulfite | 0.71 | 1.16 |
| Cyclic 1-methylethylene thionosulfite | 0.73 | 1.0g |
| Control | Seizure | Seizure |

Many of the novel esters of this invention are useful as curing agents for the vulcanization of sulfur vulcan-

TABLE I

| Example No. | Reactants | | | | | | | S, percent | | Average molecular weight | $y$ |
|---|---|---|---|---|---|---|---|---|---|---|---|
|  | Diol | Parts | $S_2Cl_2$, parts | Amine | Parts | Diluent | Ml. | Product | Calcd. | Found | |
| 5 | Propylene glycol | 76.1 | 135 | Triethylamine | 204 | Methylene Chloride | 650 | $(C_3H_6O_2S_2)_y$ | 46.40 | 45.61 | 1,100 | 8 |
| 6 | Ethylene glycol | 62.0 | 135 | ...do... | 204 | ...do... | 650 | $(C_2H_4O_2S_2)_y$ | 51.64 | 50.50 | 780 | 6 |
| 7 | 1,4-butanediol | 90.1 | 135 | ...do... | 204 | ...do... | 650 | $(C_4H_8O_2S_2)_y$ | 42.13 | 42.2 | 960 | 6 |
| 8 | 1,3-butanediol | 90.1 | 135 | ...do... | 204 | ...do... | 650 | $(C_4H_8O_2S_2)_y$ | 42.13 | 41.63 | 1,175 | 8 |
| 9 | Phenyl ethylene glycol | 138.2 | 135 | ...do... | 204 | ...do... | 650 | $((C_8H_8O_2S_2)_y$ | 31.97 | 31.20 | 1,040 | 5 |
| 10 | 1,10-decanediol | 174.0 | 135 | ...do... | 204 | ...do... | 650 | $(C_{10}H_{20}O_2S_2)_y$ | 27.10 | 27.00 | 830 | 3 |

(III) POLYMER DEGRADATION

Example 11

Into a reactor equipped with a heavy paddle stirrer, temperature sensing means, distillation head and means for addition and removal of reactants and products, there was charged 145 parts of the product of Example 3 and 10 ml. of 2,3-butanediol in which 0.5 gram of metallic sodium had been dissolved. The mixture was cautiously heated under reduced pressure (0.5 mm. Hg). A distillate was collected between temperatures of about 54° C. to 120° C., dissolved in hexane and then washed several times with water. The hexane was removed under reduced pressure leaving 41 parts of a thin yellow liquid which was purified by fractionation yielding a liquid, 1,2-dimethylethylene thionosulfite having an index of refraction, $n_D^{25}$ of 1.532 and boiling at 36° C. (0.13 mm. Hg). The purified product was subjected to elemental analysis, the results of which appear in the table below.

Calculated for $C_4H_8O_2S_2$ (percent): C, 31.56; H, 5.30; S, 42.13. Found (percent): C, 31.50; H, 5.55; S, 41.88.

In addition to the dihydric alcohols employed in the foregoing examples, other dihydric alcohols can be used to prepare cyclic compounds and polymers of this invention, for example, 1,2-pentanediol, 1,3-pentanediol, 2,3-pentanediol, 1,5-pentanediol, 3,4-octanediol, 1,2-octanediol, 1,8-octanediol, 1,2-decanediol, 1,3-decanediol, 3,4-decanediol, 1,9-nonanediol, 1,3-nonanediol, 1,2-nonanediol, 1,6-hexanediol, 1,2-hexanediol, 1,2-heptanediol, 1,2-octadecanediol, 1,5-octadecanediol, 1,2-tridecanediol, 1,5-tridecanediol, 4-cyclohexyl-1,3-butanediol, 4-cyclohexyl-1,2-butanediol, 4-cyclopentyl-1,2-butanediol and 4-cyclopentyl-1,3-butanediol.

The novel cyclic compounds of this invention are useful as additives to increase the lubricity of mineral oils as demonstrated by the data in Table II, below. The data were obtained on a Shell Four-Ball Extreme Pressure Testing machine using steel-on-steel balls, a rotational speed of 1730 r.p.m., a temperature of 25° C. and kilogram loads as indicated. The duration of the test was one minute at each load on fresh balls. The control lubricant employed was SAE grade 90 mineral oil. The compounds of the invention were added to the mineral oil in an izable rubber. This property of the instant compounds is illustrated by the data in the following table.

Rubber stocks were compounded in parts by weight as follows:

Smoked rubber sheets (natural) _____ 100.0
Furnace carbon black _____ 50.0
Zinc oxide _____ 3.0
Stearic acid _____ 2.0
Solvent refined paraffin oil, 60 weight _____ 3.0
Curing agent (as stated below) _____ 3.5
N-tert-butyl-2-benzothiazolesulfenamide _____ 0.5

Six rubber stock samples were prepared using the above-stated formulations but with different curing agents which are listed below. Stock No. 1 was prepared with a commercial curing agent widely used in current methods of rubber curing and is employed here as a control providing a basis of comparing curing activity.

Stock No.:                                                         Curing agent
1 (control) ___ 4,4'-dithiodimorpholine.
2 _____ Polymer product of Example 7.
3 _____ Cyclic 1,2-dimethylethylene thionsulfite (product of Example 1).
4 _____ Polymer product of Example 4.
5 _____ Polymer product of Example 3.
6 _____ Polymer product of Example 8.

The stocks so compounded were cured by heating in a press for 30 minutes at 144° C. The physical properties of the vulcanizates illustrate the powerful curing action of the new compounds.

TABLE III

| Stock | Module of elasticity in lbs./in.² at elongation of 300% | Tensile at break in lbs./in.² | Ultimate elongation, percent |
|---|---|---|---|
| 1 | [1] NC | [1] NC | [1] NC |
| 2 | 2,540 | 4,260 | 500 |
| 3 | 1,730 | 3,760 | 570 |
| 4 | 2,350 | 4,200 | 500 |
| 5 | 2,440 | 4,250 | 500 |
| 6 | 1,320 | 2,870 | 500 |

[1] No cure.

The cyclic esters of this invention are capable of isomerism depending on whether the double bonded sulfur atom is cis or trans to the other ring substituents. No distinction as to isomeric form has been made herein and each reference to the cyclic compounds of this invention whether by name or structure is intended to include both isomeric forms thereof.

While this invention has been described with respect to various specific examples and embodiments, it is understood that the invention is not limited thereto and that it can be variously practiced within the scope of the following claims.

The embodiments of the invention in which an exclusive property or privilege is claimed are defined as follows:

1. A polymer of the structure

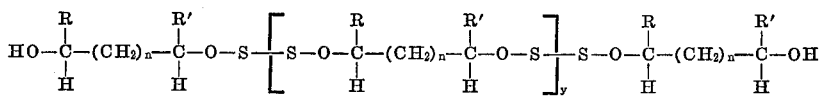

where $y$ is an integer from 0 to 10, R and R' are each selected from the group consisting of hydrogen, alkyl radicals having from 1 to 16 carbon atoms, cycloalkyl radicals having from 5 to 6 carbon atoms, providing that the total of the number of carbon atoms of R and R' is not greater than 20, and phenyl radicals and $n$ is an integer from 0 to 16.

2. A compound of the structure

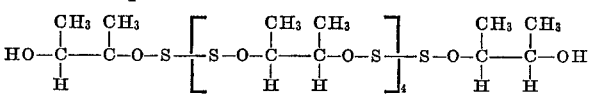

3. A compound of the structure

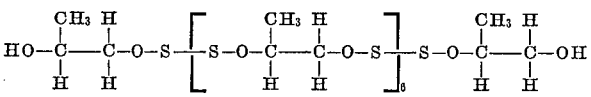

4. A compound of the structure

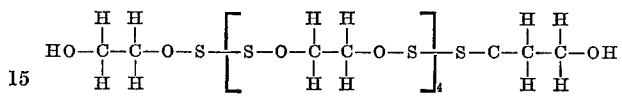

5. A compound of the structure

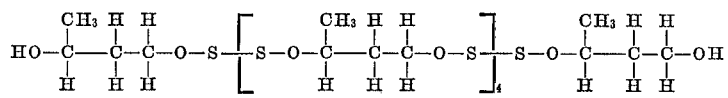

References Cited

UNITED STATES PATENTS 2,497,135   2/1950   Myles et al. _____ 260—456

LEON ZITVER, Primary Examiner

L. DeCRESCENTE, Assistant Examiner